United States Patent [19]

Roberts, Jr. et al.

[11] 4,150,897
[45] Apr. 24, 1979

[54] WHEEL-MOUNTED VEHICLE WHEEL ALIGNER

[75] Inventors: Thomas E. Roberts, Jr., Saratoga; James L. Wiederrich, Lodi; Melvin H. Lill, San Jose; Andrew K. Chang, Malibu, all of Calif.

[73] Assignee: FMC Corporaton, San Jose, Calif.

[21] Appl. No.: 773,638

[22] Filed: Mar. 2, 1977

[51] Int. Cl.² .............................................. G01B 11/26
[52] U.S. Cl. ................................... 356/152; 250/227; 250/237.6; 350/6.4; 356/155
[58] Field of Search .................... 356/141, 152, 155; 250/237.6, 227; 350/6.4

[56] References Cited

U.S. PATENT DOCUMENTS

| | | | |
|---|---|---|---|
| 3,393,455 | 7/1968 | MacMillan | 356/155 |
| 3,440,426 | 4/1969 | Bush | 250/237.6 |
| 3,511,551 | 5/1970 | Matulka | 350/6.4 |
| 3,533,699 | 10/1970 | Hopkins et al. | 356/152 |
| 3,555,285 | 4/1966 | Irving | 250/578 |
| 3,782,831 | 1/1974 | Senften | 356/152 |
| 3,865,492 | 2/1975 | Butler | 356/155 |
| 3,953,134 | 4/1976 | Appel et al. | 356/155 |

Primary Examiner—S. C. Buczinski
Attorney, Agent, or Firm—R. S. Kelly; L. B. Guernsey

[57] ABSTRACT

A light projector mounted on a front wheel of a vehicle uses a single laser to develop a beam which is split into a pair of light beams. The first light beam is projected to a calibrated mirror mounted on an adjacent rear wheel and is reflected to a target mounted near the projector on the front wheel of the vehicle so that the front wheel may be aligned with the rear wheel. The second light beam is projected to a mirror mounted on the other front wheel and is reflected to a target mounted adjacent the projector to check the toe of the front wheels. The target comprises a multichannel encoder which develops a plurality of Gray-coded binary signals in response to the position of the return beam. A rotating prism causes the light beams to sweep repetitively in a vertical plane so that the beams will strike the mirrors and the targets even when the projector is not mounted in a level position. A second prism may be moved into position to intercept the light beams and deflect them a predetermined angular amount so that the apparatus may be calibrated to correct for different spacings between the front wheels of the vehicles being checked.

17 Claims, 15 Drawing Figures

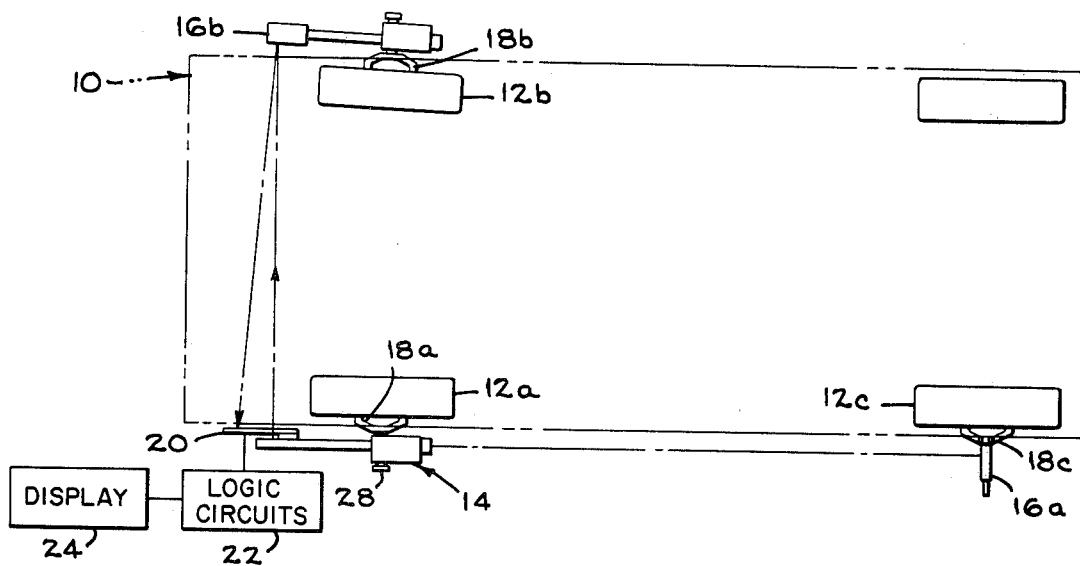
FIG_1
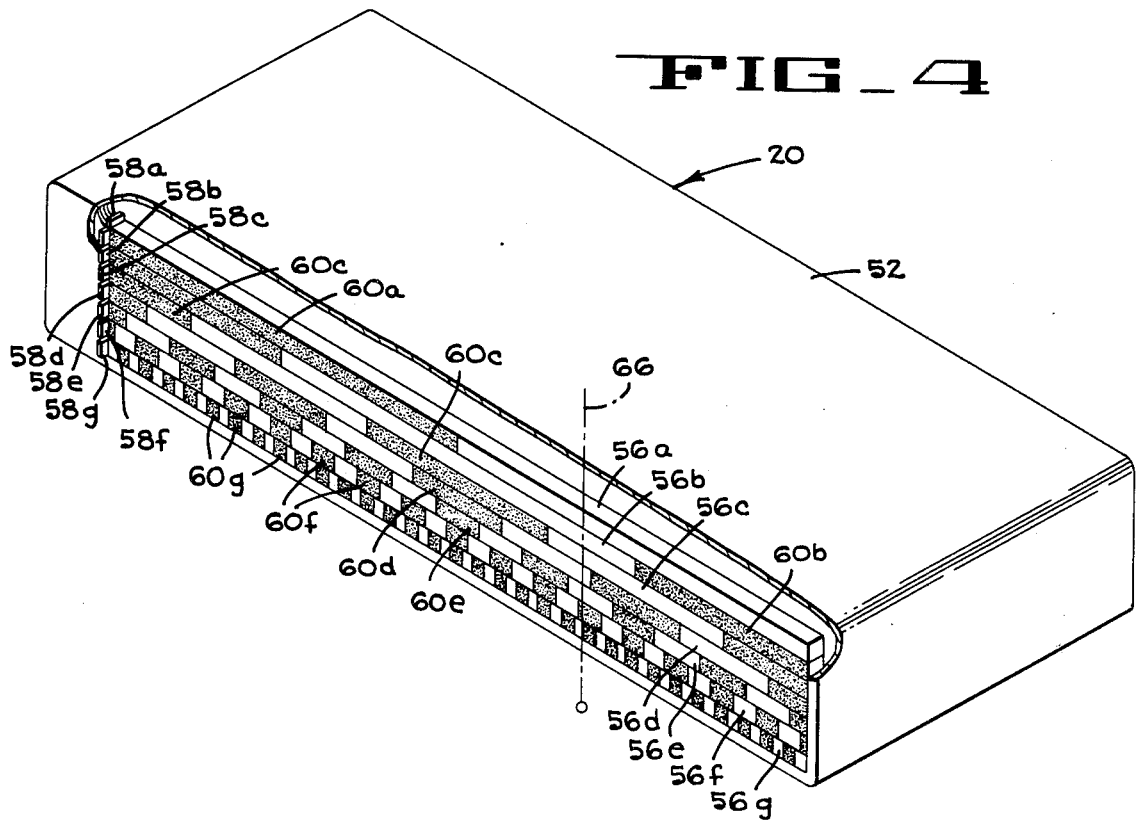
FIG_4

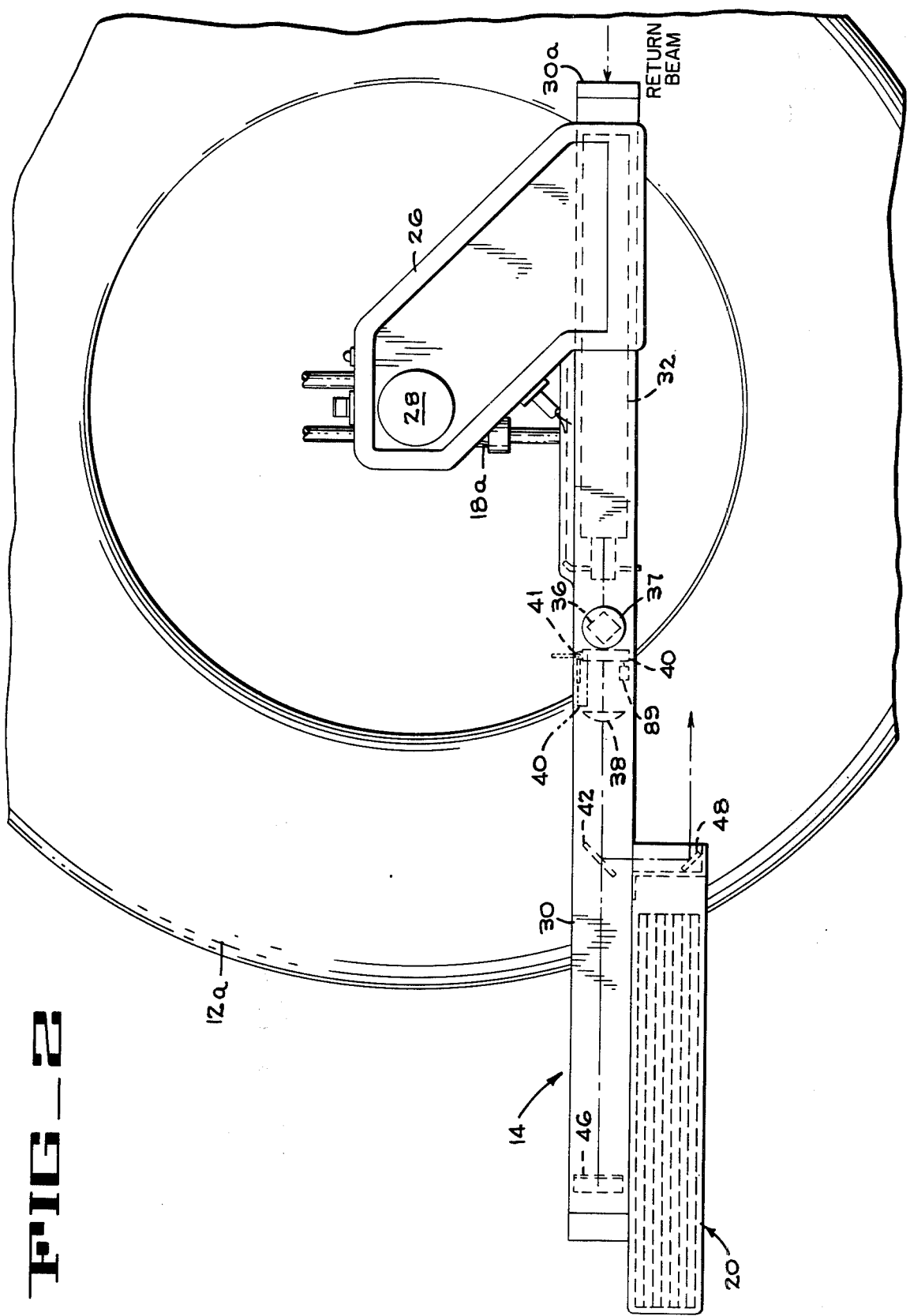
FIG_2

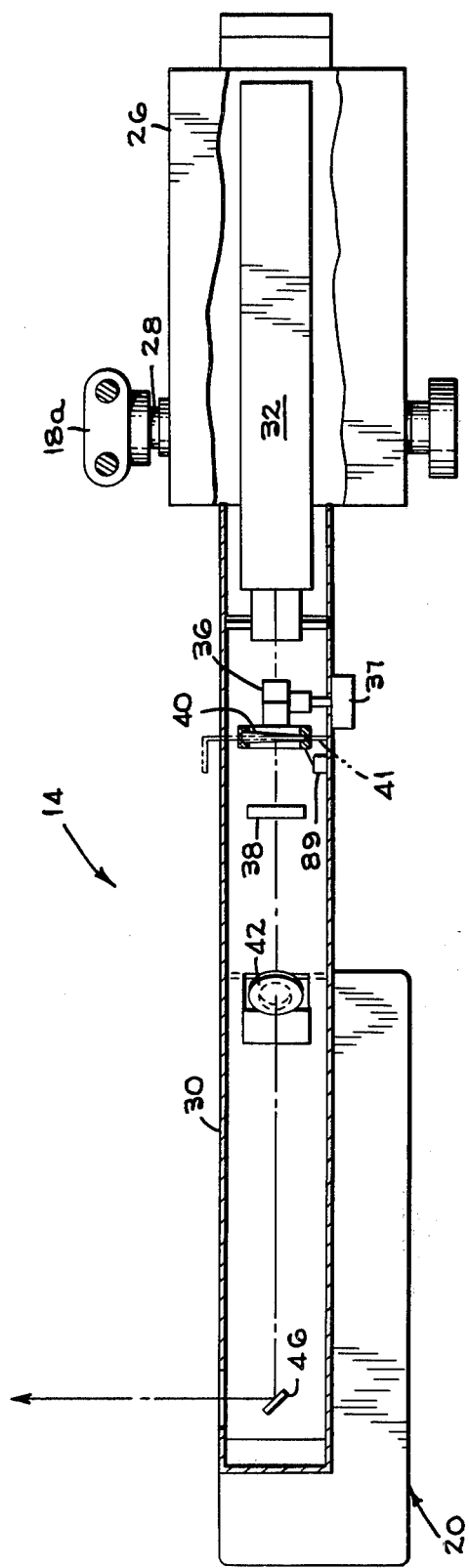

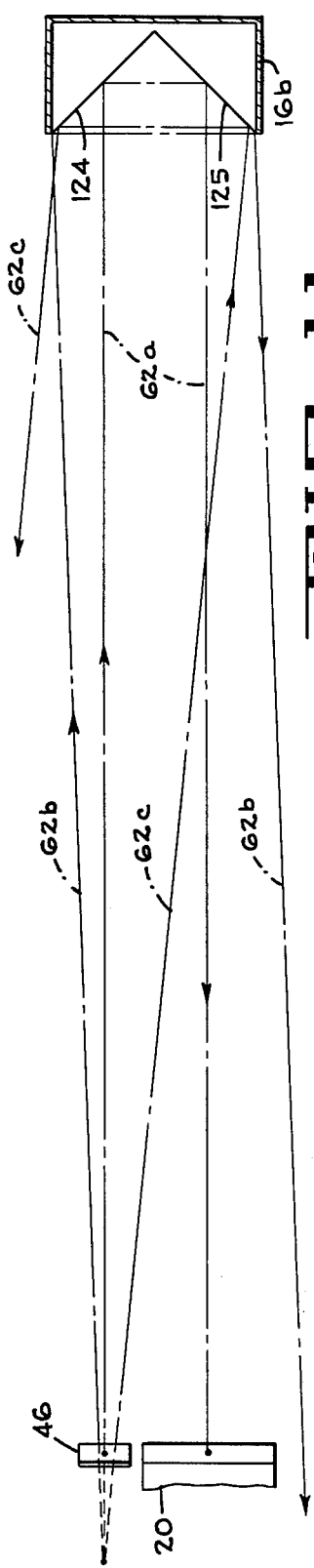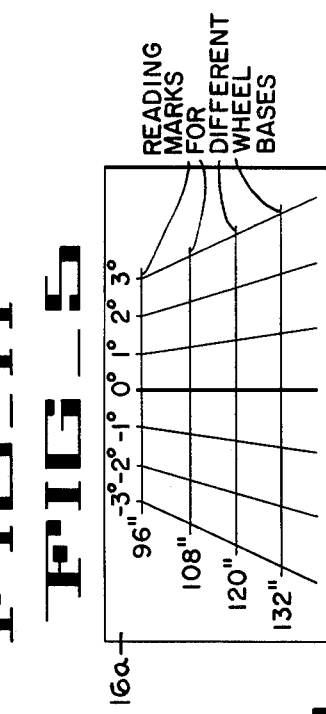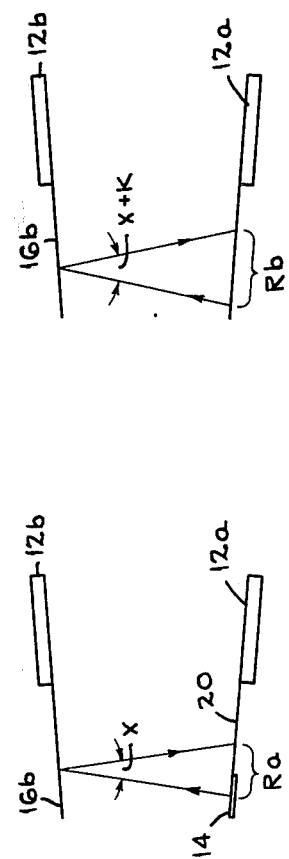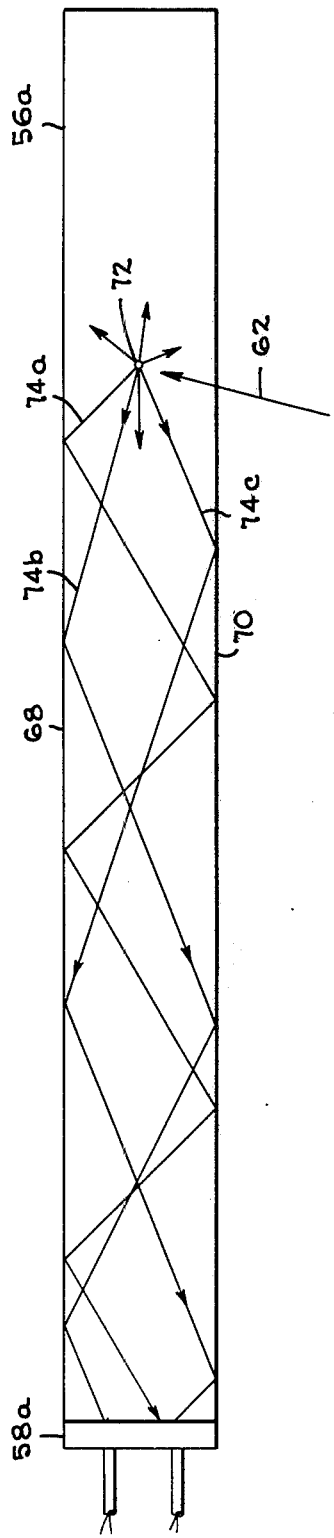

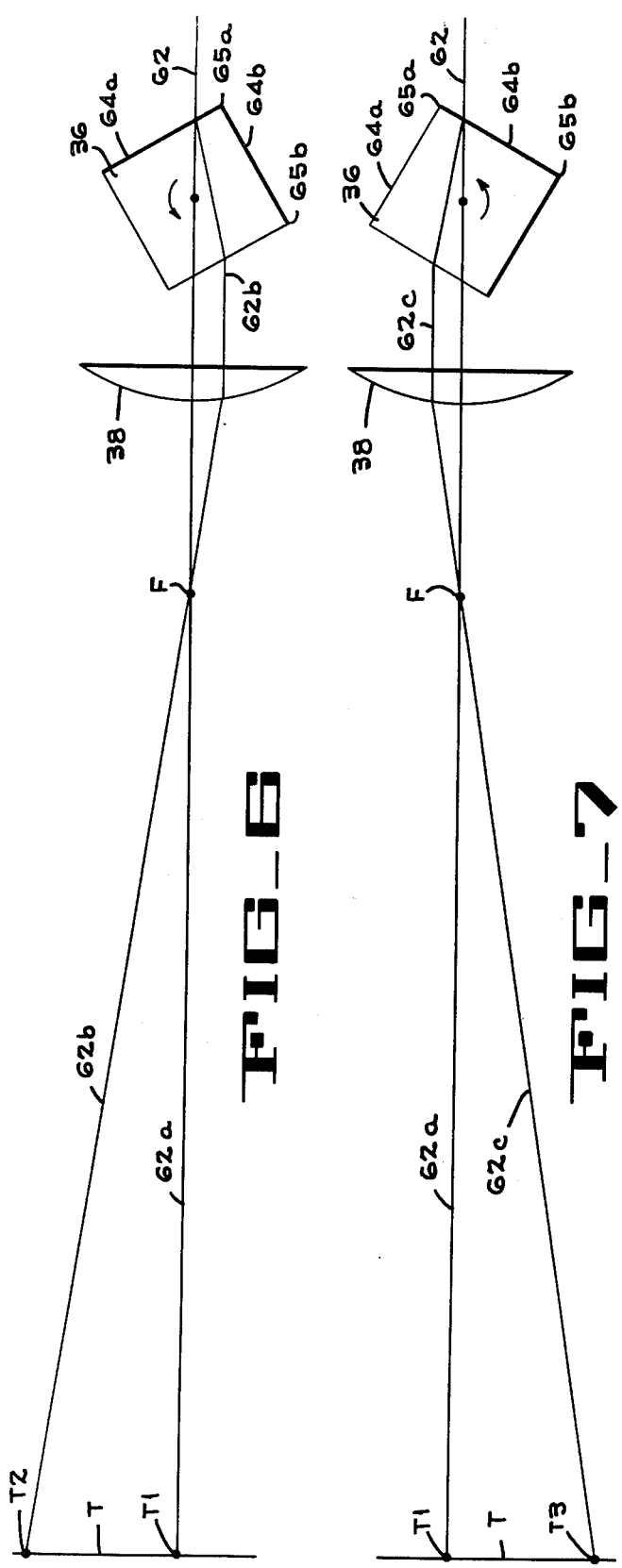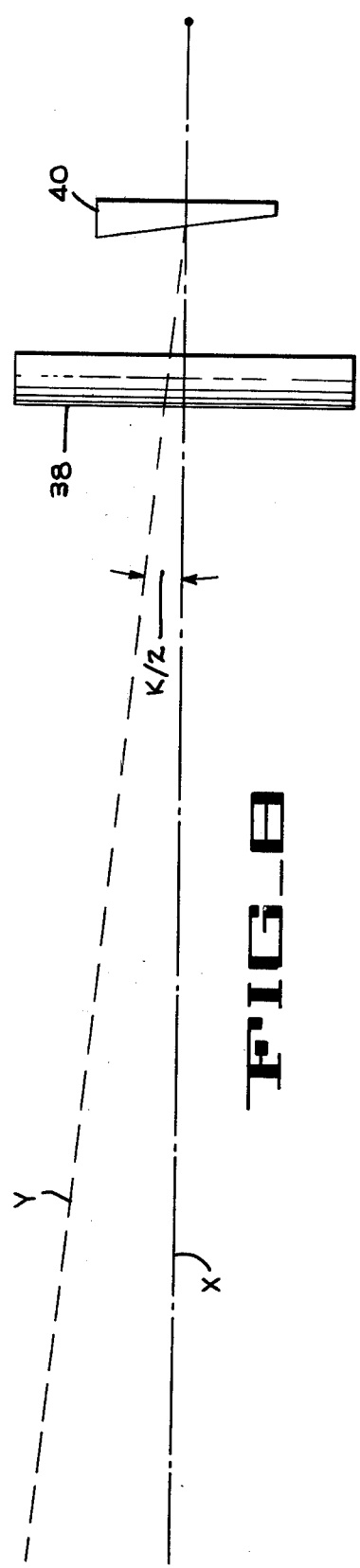

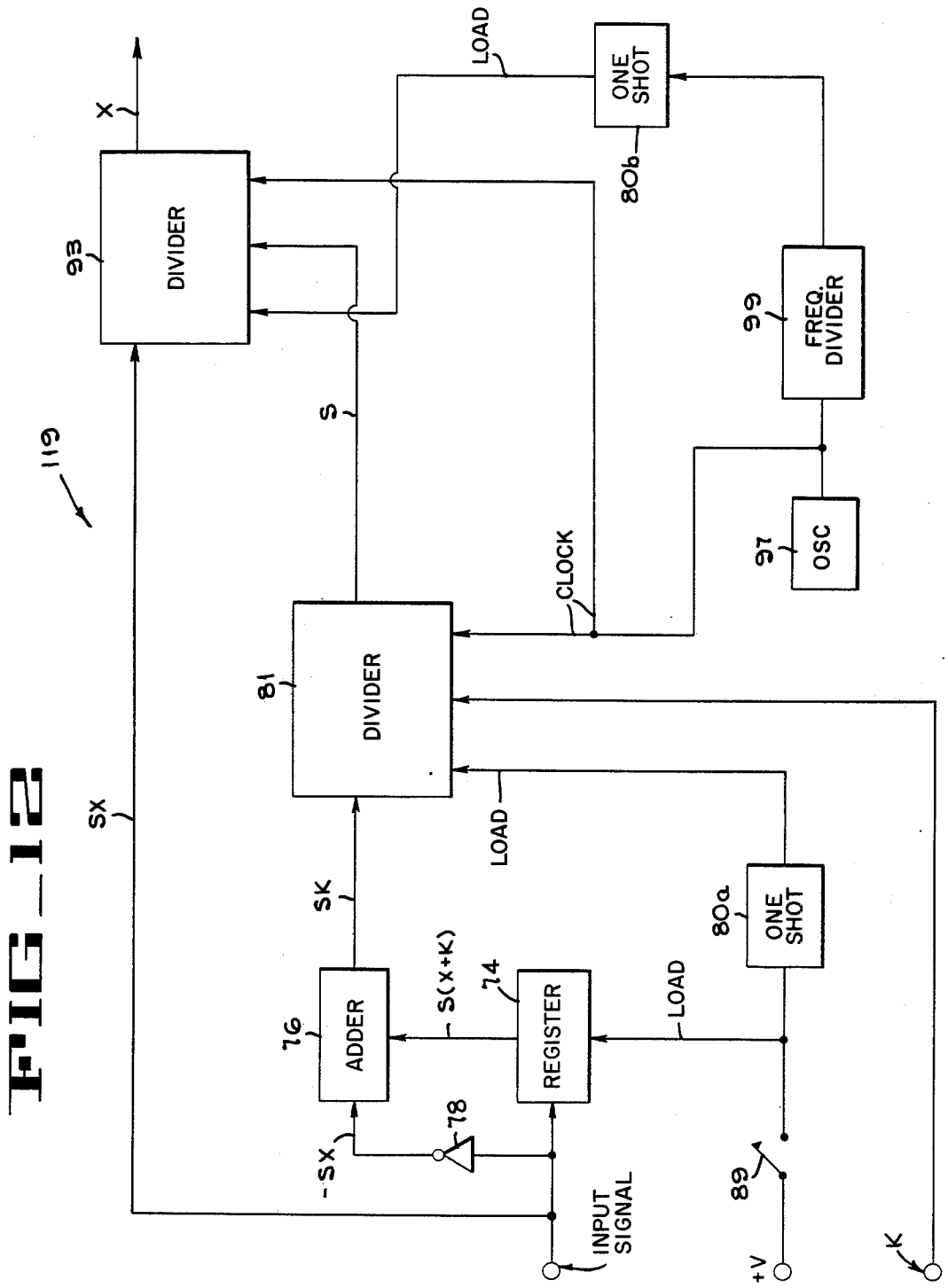

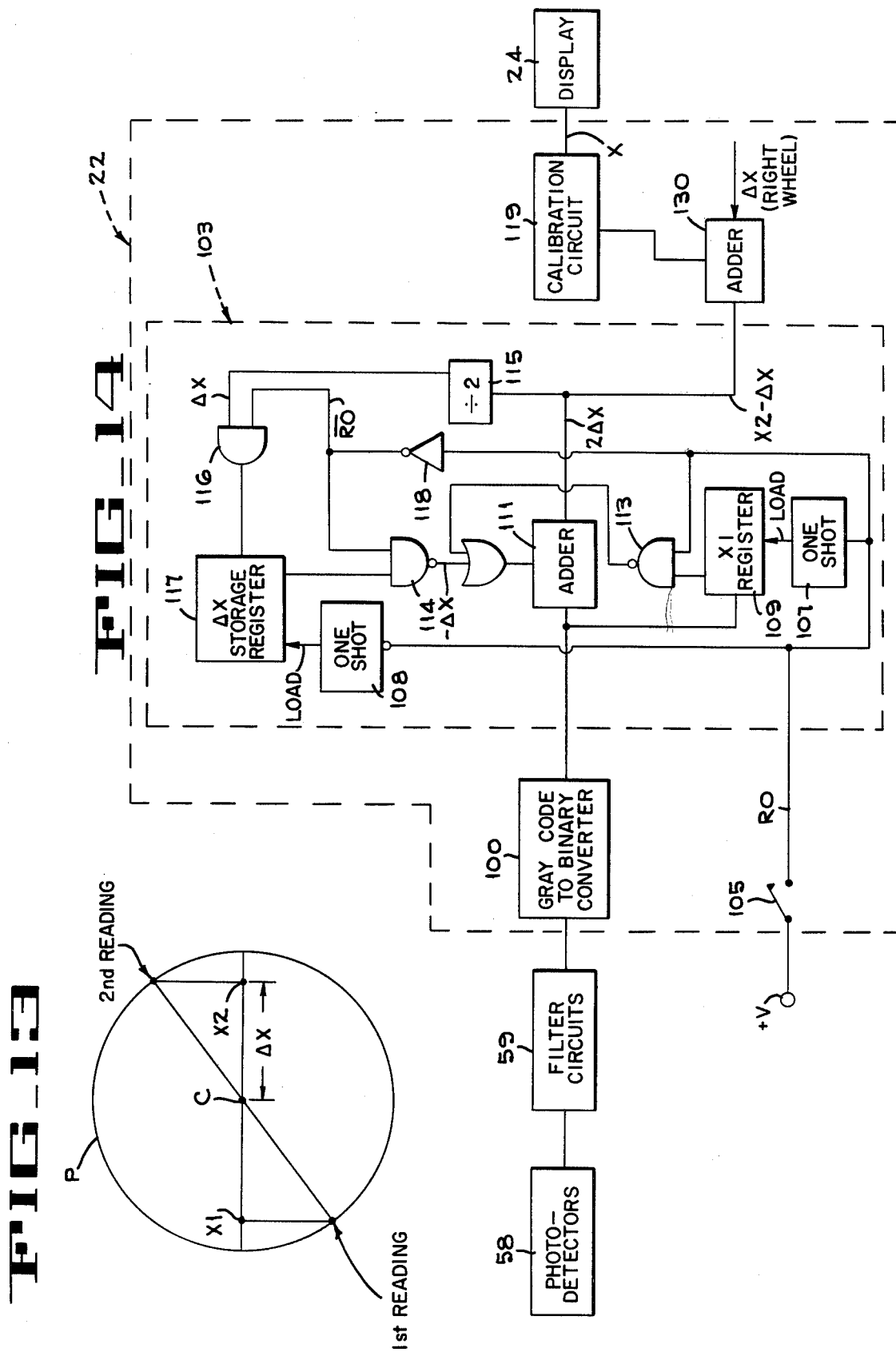

WHEEL-MOUNTED VEHICLE WHEEL ALIGNER

BACKGROUND OF THE INVENTION

1. Field of the Invention

The present invention pertains to vehicle wheel aligning apparatus, and more particularly, to a wheel-mounted aligner which uses a projected light beam and a target to determine an angle of the wheel from which the beam was projected.

2. Description of the Prior Art

In order to provide good performance of the steering portion of a motor vehicle and to promote tire life it is necessary that the front end of the vehicle be correctly aligned. To insure that the front end is correctly aligned, the accurate and rapid measurement of relatively small angles is necessary, and it is important that such measurements be made with a minimum of effort and calculation by the operator. It is also essential that the equipment being used can compensate for vehicles having widely different spacings between the wheels of the vehicle.

Various types of wheel aligning devices have heretofore been commercially utilized, and the present invention deals with apparatus wherein a projector is mounted upon one of the wheels to be aligned to project a beam having a predetermined known angular relationship with the axis of rotation of that wheel. The projected beam may be projected forwardly to fixed scales, or, in more recently developed wheel aligners, the beam may be projected across the vehicle to a "target" which is mounted upon the transversely adjacent vehicle wheel. This "target" may comprise a scale or an indicating means for indicating a predetermined angular relationship of the wheels, or, it may be comprised of a mirror merely reflecting the beam back to a scale or indicating means on the wheel from which the beam emanates. Examples of such types of wheel aligning devices are shown in U.S. Pat. No. 3,782,831 to Senften, issued on Jan. 1, 1974; U.S. Pat. No. 3,865,492 to Butler, issued on Feb. 11, 1975; U.S. Pat. No. 3,888,592 to Geul, issued on June 10, 1975; and U.S. Pat. No. 3,393,455 to MacMillan, issued on July 23, 1968.

In all of the aforedescribed prior art angular measuring devices for determining vehicle wheel alignment, a continuing problem exists with regard to obtaining the necessary accuracy of the measurements, such problem being compounded by the less than ideal garage conditions under which the measurements are typically made and by the frequent lack of necessary skill and/or training in the personnel making the measurements.

SUMMARY OF THE INVENTION

The present invention provides apparatus for fast and accurate measurement of wheel alignment in motor vehicles. A light projector mounted on a front wheel of a vehicle develops a light beam which is directed at a predetermined angle relative to the axis of rotation of the wheel. A multichannel photosensitive encoder is positioned to intercept the beam and generate a plurality of binary signals in response to the position of the intercepted light beam relative to a reference position on the encoder. These generated binary signals are then used to calculate the alignment of the wheel of the vehicle.

Another feature of the invention, in its preferred form, is the provision of a means for automatically adusting the alignment calculating means to accommodate vehicles having different wheel spacings. Since it is preferred to direct the projected light beam between the front wheels of the vehicle to measure their angular relationship, and since the light beam is projected to a fixed scale, differences in wheel spacing must be taken into account in providing a final angular measurement. This is accomplished by using an optical means, preferably a prism, to produce a known angular deflection on the fixed scale which deflection then can be used to calibrate the scale for the actual angular measurement being taken.

BRIEF DESCRIPTION OF THE DRAWINGS

FIG. 1 is a diagrammatic plan view of a motor vehicle showing the wheel alignment apparatus of the present invention mounted upon the front wheels of the vehicle in operative position.

FIG. 2 is a side elevation of the light projector and photodetector target portion of the apparatus of the present invention showing such apparatus in operative position mounted on a vehicle wheel.

FIG. 3 is a top plan view of the wheel alignment apparatus shown in FIG. 2 with portions thereof being broken away.

FIG. 4 is an enlarged detail drawing in perspective, of the photodetector target with portions thereof being broken away to illustrate the positioning of the individual photodetector element.

FIG. 5 is an enlarged front elevation view in detail of the calibrated rear mirror portion of the alignment apparatus.

FIGS. 6 and 7 are diagrammatic illustrations of the operation of the optical system of the light projector of FIG. 2.

FIG. 8 is a diagrammatic illustration of the optical system of the light projector of FIG. 2 particularly showing the operation of the calibration prism.

FIGS. 9A and 9B are schematic diagrams for illustrating the calibration method of the present invention.

FIG. 10 is a schematic diagram illustrating the operation of one of the light pipes used in the photodetector target.

FIG. 11 is a diagrammatic illustration of the manner in which the light beams are reflected between the projector and the mirror at the front wheels of the vehicle.

FIG. 12 is a block diagram of the calibration circuitry.

FIG. 13 is a tracing of the path of a light beam on the target when one of the front wheels of the vehicle is rotated.

FIG. 14 is a schematic diagram of the circuitry of the wheel alignment apparatus of the present invention.

DESCRIPTION OF THE PREFERRED EMBODIMENT

Referring now more particularly to the drawings, the plan view of FIG. 1 will be seen to disclose a vehicle 10 having a light projector 14 secured to the left front wheel 12a by a mounting bracket 18a. The projector 14 develops a pair of beams, one of which is projected in a rearward direction toward a mirror 16a that is secured to the left rear wheel 12c of the vehicle by a mounting bracket 18c. The mirror 16a reflects the first beam back toward the projector to aid in aligning the left front wheel with the left rear wheel. A second beam of light is directed across the front of the vehicle by the projector 14 to a front wheel mirror 16b which is mounted on the right front wheel 12b by a mounting bracket 18b, similar to the brackets 18a and 18c. The light beam which strikes the mirror 16b is reflected back toward the projector to a photodetector target 20 which is mounted on the underside of the projector. The returning beam causes the target to develop a position indication signal which is coupled to a logic circuit 22. The logic circuit provides signals to a display 24 which causes the display to generate a visual presentation of the wheel alignment parameters.

The projector 14, which is particularly disclosed in FIGS. 2 and 3, includes a housing 26 having a laterally projecting supporting shaft 28 which is journaled in the projector housing so that the projector will freely swing about the axis of the shaft. The shaft is connected to the wheel mounting bracket 18a which is of the type that is available for attachment to the wheels of motor vehicles. The details of one such wheel mounting bracket are shown in U.S. Pat. No. 3,709,451 to Graham. In constructing the projector 14 the weight should be distributed both fore and aft of the pivot point (axis of shaft 28) so that the projector will hang in a horizontal orientation as shown in FIG. 2. Attached to and supported within the lower end of the housing 26 of the projector is a barrel 30. Enclosed in barrel 30 is a laser 32 which provides a laser beam which is split into two beams as shown in FIG. 2, one of the beams being directed to the mirror 16a on the rear wheel of the vehicle while the other beam is directed to the mirror 16b on the opposing front wheel. Mounted forwardly of the laser 32 is a rotating prism 36 that is arranged to be continuously rotated by a motor 37, and a cylindrical lens 38 is mounted outwardly of the rotating prism. Mounting between the rotating prism 36 and the lens 38 is a movable prism 40 which is mounted upon a pivotal mounting rod 41 rotatably secured to the barrel 30 so that the prism can be rotated from its normal position (shown in phantom lines) out of the path of the laser beam into an operative position (shown in dashed lines) in the path of the laser beam. Mounted forwardly of the lens 38 is a beam splitter comprised of a half-silvered mirror 42 which splits the laser beam and directs one-half of the beam to a mirror 48 positioned directly below mirror 42 which mirror 48, in turn, projects the beam to the rear mirror 16a. Mounted at the forward end of barrel 30 is a mirror 46 which deflects the split laser beam at right angles to direct it to the mirror 16b on the opposed vehicle wheel. The photodetector target 20, which is shown in detail in FIG. 4, is positioned directly below the mirror 46 at the outer end of barrel 30.

The target 20 shown in FIG. 4 will be seen to include a plurality of parallel light pipes 55a–56g mounted in a cabinet 52 so that one side of each of the light pipes is arranged to receive light which is reflected from the mirror 16b. At the end of each of the light pipes 56a–56g is a photosensitive cell 58a–58g, respectively. A portion of each of the light pipes is covered with a mask or series of masks 60a–60g which prevents light from entering that portion of the pipe which is covered. Light which enters a pipe through any non-masked portion will be dispersed (by means to be described in greater detail hereinafter) so that at least a portion of such light will be guided along the length of the pipe to the photosensitive cell at the end of the pipe which will thereby provide an electrical signal to indicate the reception of a reflected light beam.

The basic operation of the wheel alignment apparatus of the present invention will now be described in connection with the drawings of FIG. 1 and 4. The projector 14 is mounted on the left front wheel 12a of the vehicle so that the projector transmits a light beam to the flat surface of the mirror 16a which is mounted on the left rear wheel 12c. When the front wheels of the vehicle are pointed directly ahead the beam from the projector strikes the rear mirror 16a and is reflected to a calibration point on the rearward end 30a of the barrel 30 (see FIG. 2) above the point where the beam emanates from the rear of the projector 14 and in the same vertical plane. With the left front wheel 12a adjusted to point directly ahead, the mirror 16a is then moved laterally so that the beam from projector 14 falls on the mirror scale (FIG. 5) at a mark thereon which is equal to one-half the desired toe reading for the front wheels of the vehicle. For example, if the desired toe reading for the two wheels of the vehicle is +4 degrees the mirror is adjusted so that the beam strikes the mirror at the +2 degree mark on the scale. This is readily accomplished by slidably mounting the mirror by any conventional slide mount means, such means not being shown and not being in any way critical to an understanding of the present invention. The tie rod on the left front wheel is then adjusted so that the beam returns to the zero mark on the rear mirror 16a. This sets the left front wheel to a toe of +2 degrees. After the left front wheel has been adjusted, the cross beam from the projector 14 (FIG. 1) to the mirror 16b on the right front wheel is utilized. This beam will strike the mirror 16b and be reflected to the photodetector target 20 which is mounted on the underside of the projector 14 as shown in FIG. 2. The beam striking the target 20 causes the logic circuit 22 to develop signals which are coupled to the display 24 and displayed as the total toe of the front wheels of the vehicle. The right front wheel is then independently adjusted so that the desired toe reading of +4 degrees for the two front wheels is obtained on the display 24. This procedure sets one half of the desired toe adjustment into each of the front wheels of the vehicle.

The laser beam from the projector 14 provides a small spot of light which may be projected above or below the mirrors 16a and 16b and not be reflected to the target 20 due to tilting of the projector or misalignment of the vehicle wheels. Also, as will be explained in greater detail hereinafter, the operation of the target 20 requires an elongated beam in the vertical plane. Thus, the beams that are sent both to the rear wheel 12c and the front wheel 12b are vertically elongated; that is to say, the beams are swept in an up-and-down motion so that each beam will periodically be reflected from its mirror 16a or 16b at the correct elevation to strike the corresponding target. This vertical deflection of each of the front and rear beams is produced by the rotating prism 36, the operation of which is shown diagrammatically in FIGS. 6 and 7. The prism is continuously rotated by the motor 37 (FIGS. 2 and 3). As shown in the side elevation view of FIG. 6 and 7, the laser beam 62 strikes the prism which is rotating in a counterclockwise direction. Prior to the time shown in FIG. 6 the side 64a of the prism 36 was at right angles to the incident beam 62. At that time the beam 62 passed through the prism following an undeflected path 62a through the lens 38, hitting a target T (i.e., either the target 20 or the rear end of the projector 14) at a point T1. As the prism 36 rotates to the position shown in FIG. 6 the beam is displaced in an increasing downward direction by the prism so that the beam follows the path 62b, through the lens 38 and its focal point F to the target at a point T2 located above point T1. As the corner 65a of the prism rotates upward toward the beam 62 the beam gradually moves toward its uppermost level on the target T. After the prism 36 rotates so that the corner 65a is just above the beam 62, the beam 62 enters the prism at the next side 64b of the prism and will then be displaced its maximum amount in an upward direction by the prism. When the prism is rotated slightly to the position shown in FIG. 7, it will be seen that the beam follows the path 62c through the lens 38 and the focal point F to the target at a point T3 below the point T1. As the prism continues to rotate in a counterclockwise direction the beam sweeps upwardly across the target T from the bottom of the target gradually to the top, then switches to the bottom again when the subsequent corner 65b of the prism passes through the laser beam 62. This vertical sweeping action provides a vertical beam which can be used by the photodetector array of the present invention and also compensates for any tilting of the projector or any misalignment of the wheels of the vehicle.

The mirror 16b which is used to reflect the light beam to and from the projector 14 across the front of the vehicle is, preferably, a 90 degree mirror, or roof mirror, as shown in FIG. 11. This mirror includes a pair of reflective surfaces 124 and 125 mounted at a 90 degree angle to each other. Due to the 90 degree angle any incident light beam striking one of the surfaces will be reflected to the other surface and then reflected back toward the source with the reflected beam being parallel to the incident beam, as viewed looking horizontally toward and normal to the beam as in FIG. 11. This is true no matter what the plane of the reflective surfaces is relative to a horizontal plane so long as the incident beam is reflected off both surfaces, i.e., within the 90 degree operative range of the roof mirror. Any tilting of the mirror by rotating it either clockwise or counterclockwise from the position shown in FIG. 11 may vary the spacing between the received beam and the reflected beam, but it will not change the spacial angle at which the beam is reflected back toward the source. Thus, roof mirror 16b, as shown in FIG. 11, is mounted on the right front wheel, and the mirror is adjusted to reflect light from the flat mirror 46 to the photodetector target 20. As shown in FIG. 11, the mirror 16b should be chosen so that the undeflected beam 62a, which strikes the mirror 46 in its center, strikes the approximate mid-portion of upper surface 124 and is reflected from the approximate mid-portion of the surface 125 so that it will strike the center of the photodetector target 20. As shown in FIG. 11, when the beam swings upwardly (due to the rotating prism 36) to follow path 62b, which strikes the upper edge of surface 124, the reflected beam will be below the target 20; and, as the beam swings down to follow path 62c, which strikes the lower edge of surface 125, the reflected beam will be well above the target. Thus, the normal swing of the beam will cause a vertical sweep on the reflected beam at the target which will be well above and below the target so that even if the projector 14 and mirror 16b are not perfectly oriented in the same horizontal plane a portion of the reflected beam will still sweep across the target.

The cross beam which is reflected by mirror 16b (FIG. 1) strikes the target 20 sweeping from bottom to top—for example along a line 66 as shown in FIG. 4. Each time the beam strikes one of the light pipes 56a–56g at a non-masked point the light enters the pipe and causes a signal to develop in one of the photosensitive cells 58a–58g. For example, the light striking the light pipe 56a will be guided by the pipe to the respective photosensitie cell 58a at the end of the pipe and cause the cell to develop a signal which represents a binary one. Any of the photosensitive cells which do not receive light, due to the sweeping light beam striking the masked area of the light pipe, will not produce a signal—which will represent a binary zero. It will be understood that the pattern of open and masked areas on the light pipes represents a Gray code optical pattern so that the resultant output signals from the photocells 58a–58g will be a Gray code binary output. The pattern of binary ones and binary zeros from the photocells can then be used to calculate the position in the horizontal plane at which the light beam strikes the target 20, and the position 66 at which the beam strikes the target defines a horizontal distance on the target from the point which is directly below the center of mirror 46 where the beam leaves the projector. This distance, in turn, is used to calculate the value of the toe angle (i.e., the angle in the horizontal plane) between the front wheels of the vehicle since the angle at which the beam is reflected from mirror 16b (FIG. 1) is twice the toe angle.

The light beam periodically sweeping across the unmasked area of a light pipe 56a–56g causes the corresponding photocell 58a–58g to develop signal pulses with the frequency of the pulses being equal to the rate at which the beam sweeps across the pipe. Ambient light may also cause the photosensitive cell to produce a voltage which could interfere with the desired output signal. Conventional filter circuits 59 (FIG. 14) which are tuned to the frequency of the generated pulses are connected to receive the signals produced by the photocells to separate the signal frequency from spurious signals which are developed by the ambient light. Thus, the vertically sweeping beam not only ensures that the projected beam strikes the target 20 but also develops signals in the photodetectors at a particular frequency which can be recognized and separated from spurious signals.

Details of the function and operation of the light pipes 56a–56g may be seen from the diagrammatic showing of FIG. 10. The light pipes may be formed of bars of Lucite or other optical material having a relatively high index of refraction and containing a plurality of scattering centers 72. Only one of the scattering centers is shown, but it should be understood that these centers will be distributed throughout the light pipe. The scattering centers are provided by using extruded pipes of relatively low quality which include a great many imperfections. Alternatively or additionally, a reflective surface may be provided on the side of the light pipe opposite the side where the light enters the pipe by painting this side of the pipe with a high reflectance diffuse coating which will scatter an incident light beam in a plurality of directions. When the incident light beam 62 strikes the scattering center 72 (FIG. 10) the light is reflected in a plurality of directions represented by the arrows leaving the scattering center. Some of the light rays leaving the scattering center strike the opposite side wall 68 of the light pipe and are reflected in the manner shown by light rays 74a and 74b. Other light rays may be reflected from the front wall 70 of the light pipe in the manner shown by light ray 74c. As is well known, any of the rays which strike the walls of the light pipe at an angle greater than the critical angle of the material will be reflected internally by the walls of the material until these rays reach the photosensitive cell 58a mounted on one end of the light pipe. It should be understood that other rays which leave the scattering center may be reflected from the upper and lower walls of the light pipe and be guided by these walls to the photocell 58a. The upper wall and the lower wall may be enclosed with an opaque material to prevent rays which strike these walls at an angle less than the critical angle from moving through these walls and into light pipes positioned adjacent thereto.

As with most of the motor vehicle alignment devices, in the apparatus of the present invention the angle of toe of the wheels is calculated by measuring a distance rather than by directly measuring the angle. This can be seen by referring to FIG. 9A. When the beam of light leaves projector 14 at right angles and strikes the mirror 16b so that the return beam is reflected through the angle X in the horizontal plane, the distance in the horizontal plane between the point where the beam leaves the projector and the point where the beam returns to the target 20 is measured as distance Ra. As seen in FIG. 9A distance Ra comprises one side of a right triangle, with the angle X between the incident and the reflected beam being equal to twice the toe angle between the left front wheel 12a and the right front wheel 12b. If the wheels 12a and 12b were moved further apart without changing their spacial orientation (i.e., if they were on a wider vehicle) the measured distance Ra would become larger although the angle X between the wheels would remain the same. Thus, using only the measured value of distance Ra to calculate the value of the angle X can produce an error in the toe reading if vehicles with different wheel spacings are to be checked. A true value of the toe reading may be obtained by introducing a known angle of deflection into the apparatus to calibrate the apparatus for different vehicles having different front wheel spacings. When a known angle K is added to the unknown angle X the beam is reflected as shown in FIG. 9B to provide a new measurable distance Rb on the imaginary right triangle provided in the horizontal plane. A true value for the angle X can be readily obtained where the angle X is very small (as it will be in normal wheel toe angles) by using a little mathematics and by using the measured values of Ra and Rb and the known angle of angle K. This can be seen in the derivation as follows:

Where $X = 2$ times the toe angle of the front wheels,
Let $S$ = a scale factor of the apparatus, so that for small angles,
1. $Ra = SX$
2. $Rb = S(X+K) = SX + SK$
3. $Rb - Ra = S(X+K) - SX = SK$
4. $S = SK/K = Rb - Ra/K$
5. $X = SX/S = Ra\ (K/Rb-Ra)$ The calibration circuit 119 which uses these measured values of Ra and Rb, and the known value of K to calculate the true value of the toe angle (i.e., one-half the angle X) for different wheel spacings is shown in FIG. 12. The prism 40 which produces the known value of angular deflection K is shown in FIGS. 2, 3 and 8.

The glass wedge, or prism, 40 is inserted between the laser 32 and the lens 38 by rotation of the mounting rod 41 to produce a known angle of deflection $K/2$ of the laser beam in the horizontal plane. This known angle of deflection $K/2$ can be seen by referring to the diagrammatic view of FIG. 8. It will be understood that the angle of the beam received from the mirror 16b will be at an apparent angle equal to K due to the doubling effect of the mirror.

The laser source provides a small beam of light with a plurality of rays being substantially parallel to each other. When concentrated beam passes through two or more positive lenses, such as prism 40 and lens 38, difraction may occur which would scatter the beam. One method of overcoming this difficulty would be to spread the beam by a negative lens and then refocus the beam after the beam has passed through the lenses. Thus, a negative lens can be inserted before the prism 40 to spread the laser beam, and the lens 38 can be curved in the horizontal plane to refocus the laser beam at (or near) the target. Such optical devices are not shown herein since they are conventionally used in laser beam systems and since an understanding of such optics is not critical to an understanding of the present invention.

When the wedge is out of the path of the laser beam, the beam is undeflected, as shown by beam X in FIG. 8. When the wedge 40 is in position as shown in FIG. 8, the beam is deflected by an angular amount $K/2$ as shown by beam Y.

During calibration the glass wedge 40 is inserted as shown in FIG. 8, while distance Rb (FIG. 9B) is obtained. The wedge is then withdrawn and the distance Ra (FIG. 9A) is obtained. Thus, the wedge 40 can be inserted into the path of the projected beam, the amount of deflection recorded, and then the wedge can be withdrawn and the amount of deflection recorded a second time to obtain the values of Ra and Rb which are used to find the exact angle of toe.

The calibration circuitry 119 which automatically corrects for different vehicles and performs the calculation to obtain the value of the toe angle is shown in FIG. 12. The binary signal which is produced by the converter circuitry 100 when the deflection Rb (FIG. 9B) is obtained is loaded into a register 74 by closing a switch 89 while the prism 40 is in the path of the laser beam. The switch 89 is provided in the path of the prism 40 so that it will be closed when the prism 40 is in the beam path as shown in the dashed line position of FIG. 2. The binary signal in register 74 represents the value of $SX + SK$ (i.e., RB) in the equations previously given. After being momentarily held down, the prism 40 is returned to its normal position out of the beam path (as shown in phantom lines in FIG. 2) and the switch 89 is opened. The input signal to circuit 119 (FIG. 12) after the removal of prism 40 has the value SX, i.e., Ra. The value of SX is inverted by inverter 78 and applied to an adder circuit 76 along with the value (SX + SK) from register 74. These quantities are added together to give the value SK which is coupled as the dividend to a divider circuit 81. Also applied to the divider circuit 81 as the divisor is the fixed value K. This value of K is divided into the value of SK by divider circuit 81 to provide an output value of S which is then coupled as the divisor to a second divider circuit 93. As seen in FIG. 12, the divider circuit 81 is loaded only as a result of the opening of the switch 89 which triggers one shot circuit 80a to provide a load pulse to circuit 81 after sufficient time has passed for the adder circuit 76 to provide the proper value of SK to the divider circuit. The value of SX is also coupled as the dividend to the divider circuit 93 so that S is divided into SX to obtain the output value X, which is twice the true value of the toe angle of the front wheels of the vehicle. This value can be then divided by two in a conventional binary divide network (not shown) and supplied to the display 24 where a D/A converter provides an output in a readily recognizable form. The necessary timing pulses operating the dividers is provided by a clock 97, and a one shot 80b and a freqency divider 99 are provided to provide a continuing series of load pulses for the divider 93 so that the output (angle X) will be continually updated as the wheels are adjusted to new angles. It will be noted, however, that the value of S provided by divider circuit 81 will remain unchanged so long as the prism 40 is not rotated to operate switch 89.

It is desirable that the projector 14 be mounted with the supporting shaft 28 aligned precisely with the rotary axis of the wheel 12a upon which it is mounted so that the projector will remain positioned in the same direction as the wheel is rotated. However, the projector is mounted upon the conventional mounting bracket 18a which is, in turn, clamped to the wheel. It is very difficult to attach the mounting bracket to the wheel so that it is exactly parallel to the plane of the wheel. Therefore, when the wheel is rotated the axis of the supporting shaft 28 will typically generate a conical surface of revolution generally about the axis of the wheel. This causes the projector to wobble so that the central ray of the laser beam which is projected from the projector will follow a circular path in the plane of the target as shown by path P in FIG. 13. This path is commonly known as the "run-out circle". At any instant of time the position of the beam in the "run-out circle" will be a horizontal distance $\Delta X$ away from the center location C where it would be if the supporting shaft 28 of the projector was mounted in line with the rotary axis of the left front wheel; thus, the distance $\Delta X$ represents an error which must be added to or subtracted from the obtained horizontal deflection reading SX, or Ra, in any one position of the wheel in order to provide a correct reading. The true value of the horizontal deflection of the spot on the target may be obtained by recording a first value of horizontal deflection when the wheel is in one position, rotating the wheel exactly 180 degrees to obtain another value, and then averaging the two values. These values are shown as X1 and X2 in FIG. 13. The true horizontal deflection distance for any one wheel can be calculated from the runout values obtained by using the following formulas:

$$\Delta X = \frac{X2 - X1}{2}$$

$$Ra = SX = X2 - \Delta X$$

The circuit 103 which is used to calculate the runout correction is shown in FIG. 14. When the wheel upon which the projector 14 is mounted is in a first position the converter circuitry 100 provides a first value of horizontal deflection X1 to the runout circuit 103. During this time a runout switch 105 is manually closed to provide a signal RO which triggers a one shot circuit 107 so that the value X1 will be loaded into a register 109. The wheel of the vehicle is then rotated 180 degrees so that a second value of horizontal deflection X2 will be coupled to an input of an adder circuit 111. While the switch 105 remains closed, a NAND gate 113 is enabled which causes the inverse value of X1 (i.e., −X1) to be coupled to a second input of the adder circuit 111 which adds this value to the value of X2. The value of X2−X1 (2 $\Delta X$) is then divided by 2 in a divider circuit 115 (to give the value $\Delta X$) and provided at an AND-gate 116. The switch 105 is then opened. This disables the gate 113 to block the transfer of information from register 109 to adder circuit 111. The signal RO from the switch 105 is inverted, however, by inverter 118 to then enable AND-gate 116 and NAND-gate 114. Gate 116 transfers the value $\Delta X$ to a storage register 117 where it is loaded by a trigger pulse from one shot circuit 108, the one shot circuit being triggered by the opening of switch 105. NAND-gate 114 inverts and transfers the value $\Delta X$ to the second input of the adder circuit where it is added to the input X2 to provide an output signal X2−$\Delta X$, i.e., a horizontal deflection reading which has been corrected for runout error. This signal is applied to the calibration circuit 119 where it is processed as previously pointed out. It should be noted that the timing of the one shot circuit 108 is such that the storage register will be loaded only with the value $\Delta X$ previously provided at gate 116.

The wheels of a vehicle may be aligned with the apparatus of the present invention by sequentially performing the following steps:

1. With the projector 14 mounted on the left front wheel and the calibrated mirror 16a mounted on the left rear wheel, turn the left front wheel until the beam from the projector is reflected from the mirror 16a to a zero reference mark on the rearward end 30a of the barrel 30 (FIG. 2) in the plane of the rearwardly directed beam. This insures that the left front wheel is pointed directly ahead.

2. Move the mirror 16a at right angles to the plane of the rear wheel until the projector beam strikes the mirror scale at a value equal to one-half the desired total toe angle.

3. Jack up the left front wheel and close the Runout switch 105. Rotate the left front wheel 180 degrees, and then open the switch 105. Lower the left front wheel to the ground without changing its rotative position. This procedure provides a runout corrected value for the horizontal deflection of the beam from the left front wheel. 4. Jack up the right front wheel and repeat step number 3 for this wheel. A separately activated run-out correction circuit (not shown) may be provided for the right wheel so that another factor $\Delta X$ can be computed and added to the horizontal deflection by means of an adder circuit 130 (see FIG. 14). This adds the run-out correction of the right front wheel to the correction of the left front wheel to obtain a total runout correction for the horizontal deflection distance signal which is transferred to the calibration circuit 119.

5. Rotate the glass wedge 40 (FIG. 2) into position to intercept the light beam and then rotate it back to calibrate the apparatus for the particular vehicle being checked.

6. Set steering wheel in straight ahead position.

7. Adjust the left front tie-rod until the rearwardly directed light beam returns to the zero mark on the mirror scale of the rear mirror 16a. This now sets the proper toe angle on the left front wheel.

8. Adjust the right tie-rod until the desired total toe angle of the front wheels of the vehicle is displayed in the display 24.

Although, in the preferred form of the invention, the photodetector target 20 and the projector 14 were mounted on the same wheel and the reflecting mirror 16b is mounted on the opposed wheel, it will be understood that it is within the scope of the present invention to eliminate the mirror 16b and mount the target 20 on the wheel opposed to the wheel upon which the projector is mounted whereby the beam will be projected only in one direction across the front of the vehicle.

Although the best mode contemplated for carrying out the present invention has been herein shown and described, it will be apparent that modification and variation may be made without departing from what is regarded to be the subject matter of the invention.

What is claimed is:

1. Apparatus for measuring wheel alignment of a motor vehicle comprising:
   means for projecting a directional beam of light;
   means for attaching said projecting means to a first wheel of said vehicle for projecting said directional beam with the longitudinal axis of said beam being in a predetermined angular relationship to a line generally parallel to the axis of rotation of said first wheel;
   a multichannel photosensitive encoder positioned to intercept said beam, said encoder having means for generating a plurality of binary signals indicative of the distance between the position on said encoder at which the light beam is intercepted and a reference position thereon; means for automatically modifying said binary signals in accordance with the distance between said projecting means and said encoder; and
   means responsive to said binary signals for indicating an angular position of said wheel.

2. Apparatus for measuring wheel alignment of a motor vehicle, comprising
   means for projecting a directional beam of light;
   means for attaching said projecting means to a first wheel of said vehicle for projecting said directional beam with the longitudinal axis of said beam being in a predetermined angular relationship to a line generally parallel to the axis of rotation of said first wheel;
   a multichannel photosensitive encoder positioned to intercept said beam, said encoder having means for generating a plurality of binary signals in response to the distance between the position of the light beam intercepted by said encoder and a reference position;
   means responsive to said binary signals for indicating an angular position of said wheel;
   means for deflecting said directional beam through a predetermined angle; and means for comparing the binary signals from said encoder when said beam is deflected through said predetermined angle with the binary signals when said beam is not deflected through said predetermined angle.

3. Apparatus for measuring wheel alignment of a motor vehicle, comprising
   means for projecting a directional beam of light;
   means for attaching said projecting means to a first wheel of said vehicle for projecting said directional beam with the longitudinal axis of said beam being in a predetermined angular relationship to a line generally parallel to the axis of rotation of said first wheel;
   a multichannel photosensitive encoder positioned to intercept said beam, said encoder having means for generating a plurality of binary signals in response to the distance between the position of the light beam intercepted by said encoder and a reference position;
   means responsive to said binary signals for indicating an angular position of said wheel; said encoder including a plurality of light pipes mounted in a generally parallel relationship in a plane generally perpendicular to the direction of the received light beam, a plurality of light sensors, means for mounting each of said sensors at a corresponding end of one of said light pipes, and means for masking portions of each of said light pipes to restrict the area where light may enter said pipes, said masking being in a predetermined optical code pattern.

4. Apparatus for measuring wheel alignment as defined in claim 3 wherein said means for projecting includes means for sweeping said beam through a predetermined angle to insure that said beam is intercepted by each of the channels of said encoder.

5. Apparatus for measuring wheel alignment as defined in claim 4 wherein said means for sweeping comprises a prism and a motor operating to drive said prism rotationally, said prism being oriented so that said beam sweeps in a vertical plane.

6. Apparatus for measuring wheel alignment as defined in claim 3 including a reflecting means for mounting on a second front wheel of said vehicle to interecept said directional beam, and means for mounting said encoder on said first front wheel, said reflecting means reflecting said beam to said encoder.

7. Apparatus for measuring wheel alignment as defined in claim 3 including circuit means for using said plurality of binary signals to calculate a wheel alignment parameter, said circuit means being coupled to the output of said encoder.

8. Apparatus for measuring wheel alignment of a motor vehicle comprising:
   means for projecting a directional beam of light;
   means for attaching said projecting means to a first wheel of said vehicle for projecting said directional beam with the longitudinal axis of said beam being in a predetermined angular relationship to a line generally parallel to the axis of rotation of said first wheel;
   means on a second wheel of said vehicle to intercept said beam;
   a target having a fixed scale means thereon positioned on one of said wheels to intercept said beam;
   means responsive to the location of the received beam on said target for indicating an angular position of said first wheel relative to said second wheel;
   means for selectively deflecting said beam by a predetermined angular amount; and
   calibration means responsive to said selective deflection means for automatically calibrating said angular position indicating means in accordance with the distance between said first and second wheels.

9. Apparatus for measuring wheel alignment as defined in claim 8 wherein said means for selectively deflecting said beam comprises a prism and means for selectively moving said prism into and out of the path of said beam.

10. Apparatus for measuring wheel alignment as defined in claim 9 incuding switch means operatively associated with said prism, said switch means being connected to said calibration means, said calibration means including means activated by said switch means for storing a factor by which the deflection distance of the beam must be multiplied to provide the angle of deflection of the beam.

11. Apparatus for measuring wheel alignment as defined in claim 10 wherein said target comprises a multichannel photosensitive encoder having means for generating a plurality of binary signals.

12. A method of measuring wheel alignment of a variety of motor vehicles having different spacings between the steerable wheels thereof including the steps of:
   mounting a light projector on a first wheel of said vehicle;
   projecting a directional beam of light in a predetermined angular relationship to a line generally parallel to the axis of rotation of said first wheel;
   mounting a target on a second wheel of said vehicle in a predetermined angular relationship to a line generally parallel to the axis of rotation of said second wheel and in a position to receive said directional beam;
   recording the position of said directional beam on said target;
   deflecting said directional beam through a predetermined angle;
   recording the position of said deflected beam on said target; and
   calculating the angle of said first wheel relative to the angle of said second wheel irrespective of the distance between said first and said second wheels by calibrating the position of said undeflected directional beam on said target in accordance with the position of said deflected beam on said target.

13. A method of measuring wheel alignment as defined in claim 12 including the step of:
   moving a glass wedge into the path of said directional beam to deflect said beam through said predetermined angle.

14. A method of measuring wheel alignment of a variety of motor vehicles having different spacings between the steerable wheels thereof including the steps of:
   mounting a light projector on a first wheel of said vehicle;
   projecting a directional beam of light in a predetermined angular relationship to a line generally parallel to the axis of rotation of said first wheel;
   mounting a mirror with a reflective surface in a predetermined angular relationship to a line generally parallel to the axis of rotation of a second wheel of said vehicle and with said reflective surface in a position to receive and reflect said directional beam;
   mounting a target on said first wheel to receive the directional beam reflected from said mirror;
   recording the position of said directional beam on said target;
   deflecting said projected beam through a predetermined angle;
   recording the position of said deflected beam on said target; and
   calculating the angle of said first wheel relative to the angle of said second wheel irrespective of the distance between said first and said second wheels by calibrating the position of said undeflected directional beam on said target in accordance with the position of said deflected beam on said target.

15. A method of measuring wheel alignment as defined in claim 14 including the step of:
   moving a glass wedge into the path of said directional beam to deflect said beam through said predetermined angle.

16. Apparatus for measuring wheel alignment of a motor vehicle comprising;
   a light source providing a directional beam of light having a narrow vertically elongate projection on a vertical plane substantially perpendicular thereto;
   means for attaching said light source to a wheel on the vehicle and for projecting said light beam with the longitudinal axis thereof being in a predetermined angular relationship to a line generally parallel to the axis of rotation of said wheel;
   a multichannel photosensitive encoder having a continuous face portion positioned to intercept said directional light beam, said encoder having means for generating a plurality of binary signals indicative of the distance measured along said face portion in a direction perpendicular to said elongate dimension of said beam between the position at which said light beam is intercepted thereon and a reference position; means for automatically modifying said binary signals in accordance with the distance between said projecting means and said encoder; and
   means responsive to said modified binary signals for indicating an angular position of said wheel.

17. Apparatus for measuring wheel alignment of a motor vehicle comprising;
   means for projecting a directional beam of light;
   means for attaching said projecting means to a wheel of said vehicle and for projecting said directional beam with the longitudinal axis thereof being in a predetermined angular relationship to a line generally parallel to the axis of rotation of said wheel;
   a photosensitive encoder having a plurality of parallel elongate light conducting channels, each channel being exposed at one side thereof to provide a planar face on said encoder, each of said channels having a light sensor mounted at one end thereof and having optically coded spaced light passing and light obstructing areas at the exposed surfaces thereof, said encoder operating to intercept said directional beam and to provide a binary signal from each channel, wherein said binary signals are indicative of the distance in a horizontal plane on said planar face from a reference position to the position at which said directional beam strikes said encoder;
   and means responsive to said binary signals for indicating a toe angle of said wheel.

* * * * *

Disclaimer 4,150,897.—*Thomas E. Roberts, Jr.*, Saratoga; *James L. Wiederrich*, Lodi; *Melvin H. Lill*, San Jose; and *Andrew K. Chang*, Malibu, Calif. WHEEL-MOUNTED VEHICLE WHEEL ALIGNER. Patent dated Apr. 24, 1979. Disclaimer filed Nov. 3, 1983, by the assignee, *FMC Corp.*

Hereby enters this disclaimer to claims 3, 4, 5, 6, 7 and 17 of said patent.

[*Official Gazette December 20, 1983.*]